United States Patent [19]
DiStefano

[11] 3,721,803
[45] March 20, 1973

[54] PIZZA PIE WARMING CARRIER

[76] Inventor: Alfred DiStefano, 606 Plainview Road, Plainview, N.Y. 11803

[22] Filed: March 16, 1971

[21] Appl. No.: 124,772

[52] U.S. Cl. ............. 219/387, 99/401, 219/521, 219/524, 220/16
[51] Int. Cl. ................. A21b 1/52, F27d 11/02
[58] Field of Search ............. 219/386–387, 405, 219/521, 524; 99/99, 400–401, 432–433; 220/16

[56] References Cited

UNITED STATES PATENTS

| | | | |
|---|---|---|---|
| 1,683,889 | 9/1928 | Hayne | 219/386 X |
| 2,656,946 | 10/1953 | Clarke | 220/16 |
| 2,731,542 | 1/1956 | Daniels | 219/217 |
| 3,026,399 | 3/1962 | Lighter | 219/405 |
| 3,219,798 | 11/1965 | Farrell | 219/387 |
| 3,385,952 | 5/1968 | Mix | 219/387 |
| 3,573,430 | 4/1971 | Eisler | 219/386 X |

*Primary Examiner*—Volodymyr Y. Mayewsky
*Attorney*—Bauer & Amer

[57] ABSTRACT

A warming carrier for a cardboard boxed pizza pie including an electric heating source to maintain the elevated temperature of the pizza pie and also the vapor state of moisture within the box and formerly on the pizza pie, and a silver foil condensing surface adjacent the upper cardboard box wall to condense said vapor and contribute to causing absorbing contact of the same with said upper cardboard wall. As a consequence, the pie crust is prevented from becoming undesirably soggy and moisture laden.

4 Claims, 4 Drawing Figures

PATENTED MAR 20 1973 3,721,803

INVENTOR
ALFRED DI STEFANO

BY *Bauer & Amer*
ATTORNEYS

PIZZA PIE WARMING CARRIER

The present invention relates generally to a carrier for a pizza pie or like food product, and specifically to a heated enclosure for the pie which not only maintains the pie at a reasonably elevated temperature but also prevents it, and particularly its crust, from becoming soggy and moisture laden.

As generally understood, a pizza pie is typically purchased at a restaurant or other location having the baking ovens required for its production and is then transported to a remote location for consumption. Presently known carriers which are designed specifically for or which can be adopted for the transportation of pizza pies make use of heat insulation materials and, to varying degrees of success, maintain the elevated temperature of the pie by minimizing heat loss therefrom. These prior art carriers, however, have no effective capability of controlling moisture content, and specifically in preventing sogginess of the pie crust. An important contribution of the present invention is the recognition that the highly absorbent cardboard box, in which the pizza pie is typically placed preparatory to its transportation, can be advantageously used to provide this moisture content control.

Broadly, it is an object of the present invention to provide an improved pizza pie carrier overcoming the foregoing and other shortcomings of the prior art. Specifically, it is an object to provide a carrier for a cardboard boxed pizza pie which during its operating interval contributes to the moisture content, which ordinarily causes the pie crust to become soggy, to instead become absorbed by the pie cardboard box.

A pizza pie carrier demonstrating objects and advantages of the present invention includes a vinyl enclosure sized to fit about the boxed pizza pie and having an opposing heating source and condensing surface which then respectively assume advantageous positions on opposite sides of the pizza pie box. During operation of the heating source there is vapor flow, similar to gradient heat flow, from the heating source to the condensing surface which effectively removes the vapor from the pie to a remote location. Moreover, the condensing surface contributes to absorption of the moisture content at said remote location.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 3:
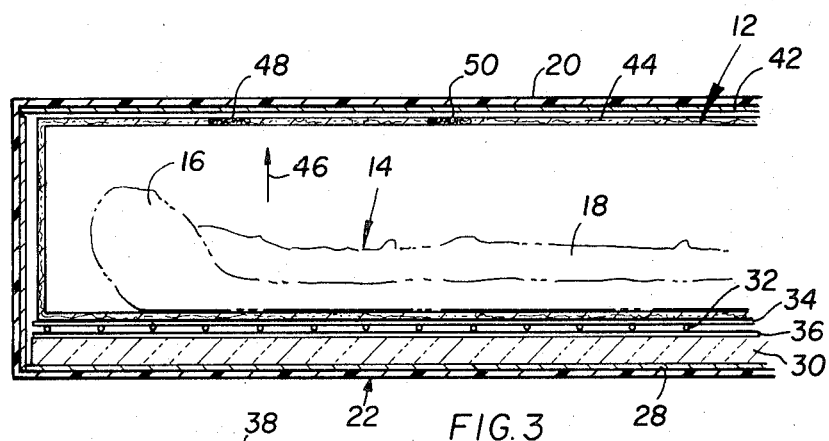
FIG. 3 is a side elevational view, on an enlarged scale, of the carrier in cross section and illustrating further internal structural features.

Reference is now made to the drawings wherein there is shown a carrier, generally designated 10, demonstrating objects and advantages of the present invention, said carrier being particularly advantageous for use in connection with a boxed pizza pie or like food product, generally designated 12. As is generally understood, a typical pizza pie, generally designated 14 in FIG. 3, is purchased at a restaurant or place where it is made in a hot condition. It is then required to be transported by the purchaser to his home or other location where it is consumed. As is further generally understood, the pie 14 includes a bread-like base having a crisp edge 16 which contains the cheese and other ingredients, generally designated 18, of the pie. To preserve maximum taste enjoyment of pie 14, not only must the ingredients 18 be sufficiently warm and thus essentially in their condition at the time of the removal of the pie from the baking ovens, but also, in accordance with the present invention, it has been recognized that the peripheral crust 16 must be prevented from becoming moisture-laden and thus soggy during the time that the boxed pie 12 is being transported to the home of the purchaser. As will be herein described in detail, the carrier 10 is effective in maintaining not only the elevated temperature of the pie ingredients 18, but also in keeping the crisp pie crust 16 in a dry condition which best contributes to eating enjoyment of the pie.

Referring to the drawings, and particularly to FIG. 3, the carrier 10 includes an outer foldable carrying case, preferrably fabricated of supported vinyl, formed of top and bottom sections 20 and 22, respectively, interconnected, by heat sealing or other appropriate means, as at 24. Both the sections 20 and 22 have side walls, collectively designated 26, also heat sealed or otherwise appropriately connected to the main body portions thereof which fit within each other in the FIG. 3 closed position of the carrier 10.

As is perhaps best illustrated in FIG. 3, the carrier bottom section 22 includes adjacent the vinyl outer wall thereof a bottom layer of silver foil 28 which is coextensive with the internal area or dimension of the bottom section 22. In practice, the silver foil 28 serves as a heat-reflecting surface to confine heat generated within the internal compartment bounded by the sections 20 and 22 within this compartment and thereby maintain the elevated temperature of the pizza pie 14.

Adjacent the foil 28 is a cotton matting or pad 30 which similarly is coextensive with the area or dimension of the bottom section 22. In practice, pad 30 serves as a heat barrier or insulation preventing the bottom section 22 from becoming too hot to touch so that it is difficult to handle the carrier 10. That is, pad 30 maintains the bottom surface 22 merely warm to the touch and therefore convenient for handling.

Figure 1:
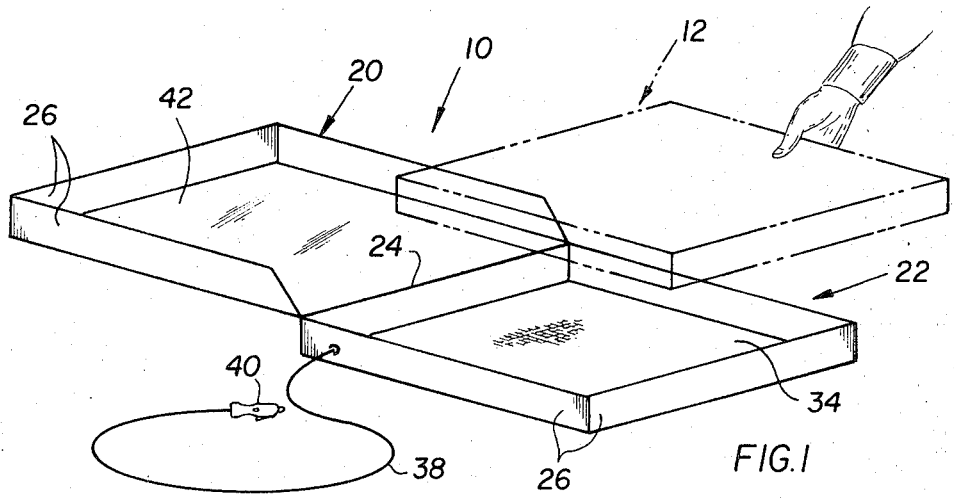
FIG. 1 is a perspective view illustrating the contemplated manner of utilizing the carrier of the present invention for a boxed pizza pie or like food product.
Figure 2:
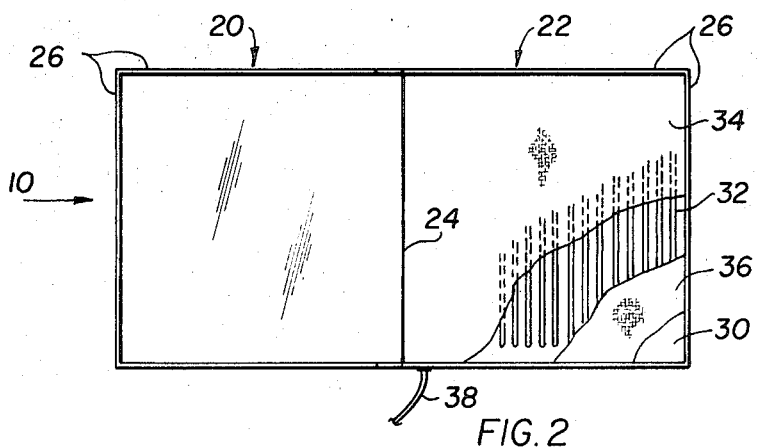
FIG. 2 is a plan view, on a reduced scale, of the carrier with portions broken away to better illustrate internal structural features thereof.

Adjacent the pad 30 is an electric resistance wire 32 sandwiched between fabric covering 34, 36. As best illustrated in FIGS. 1 and 2, the electrical resistance wire 32 is laid out in an undulating pattern which entirely covers the surface area of the bottom section 22. The wire pattern 32 has an electrical connection to an external conductor 38 which, in turn, terminates in a plug 40 of conventional design of the type which is readily plugged into a cigarette lighter of an automobile. Satisfactory results have been achieved with one such plug sold under the trademark "SAFCO".

Returning again primarily to FIG. 3, it will be understood that there is adjacent the upper carrier wall 20 a silver foil 42 which, like the previously noted foil 28, is also coextensive with the area and dimension of the internal compartment bounded by the sections 20 and 22. Foil 42, foil 28, functions as a heat reflector during the operating interval of the carrier 10. Also, surface 42, because of its composition of silver foil, is effective in remaining at a lower temperature than the materials adjacent to it which have a higher heat-absorbing characteristic. As a consequence, the foil 42 effects the area adjacent to it, including a top wall 44 of the cardboard box 12 which contains the pizza pie 14, by causing a decrease in the temperature of said adjacent area and of the wall 44. The practical effect of this is that moisture which is evaporated as vapor from the pie 14, and particularly from the peripheral crust 16, rises upwardly therefrom in the direction 46 into the cooler zone adjacent the foil 42 and wall 44. Thus, the vapor condenses when making contact with the wall 44 which, as just noted, has been cooled as a result of heat transfer from it to the foil 42. Since the entire box 12, and particularly the upper wall 44 is fabricated of cardboard which is known for its ability to absorb water, the absorbing contact made between the condensing droplets and the wall 44, as at 48 and 50, results in the absorption of these droplets within the cardboard wall 44. In this manner, moisture content within the box 12, which ordinarily would result in the pie crust 16 becoming moisture laden and therefore soggy, is prevented from condensing and falling again upon the pizza pie 14 by the absorbing contact made with the upper cardboard wall 44. It will, of course, be understood that absorbing contact between the condensed droplets and the cardboard wall 44 occur throughout the entire surface of the wall and not just at the exemplary locations 48 and 50.

Figure 4:
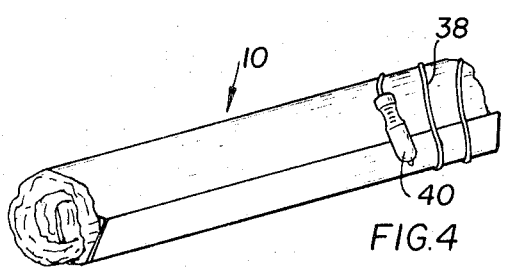
FIG. 4 is a partial perspective view illustrating the compact rolled-up storage condition of the carrier hereof.

A further advantageous feature of the carrier 10 hereof is illustrated in FIG. 4. As shown therein, the materials of construction of the carrier 10 contribute to the same having a rolled, compact condition as illustrated in FIG. 4 after the removal therefrom of the box 12 and its food product content 14.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. A pizza pie carrier comprising an absorbent cardboard box having a top wall, a bottom wall and side walls bounding an internal compartment for said pizza pie, a foldable carrying case sized to accommodate said box therein, a battery-operated electric heating source operatively arranged as an integral part of said carrying case bottom wall effective to cause moisture on said pizza pie to evaporate therefrom as vapor, and heat-reflective material having a surface of substantially the same size as the top wall of said box operatively arranged in external position adjacent the top wall of said box effective to reflect heat therefrom and cause a surface temperature resulting in the condensation of said vapor contacting it into droplets of moisture preparatory to said moisture droplets having absorbing contact with said box top wall, whereby said moisture droplets are prevented by said absorption within said box top wall from falling on said pizza pie.

2. A pizza pie carrier as defined in claim 1 including a body of heat insulating means in an interposed position between said heating source and said carrying case bottom wall effective to maintain said bottom wall at a conveniently reduced temperature to thereby facilitate the transportation thereof.

3. A pizza pie carrier as defined in claim 2 including a heat reflecting silver foil disposed along the interior of said carrying case bottom wall to increase the efficiency of said heating source in causing said evaporation of moisture into vapor.

4. A pizza pie carrier as defined in claim 3 wherein said heating source is a foldable arrangement of an electrical resistance wire which contributes to a folded, compact storage condition for said food product carrier upon the removal therefrom of said box-like enclosure.

* * * * *